US012666165B2

(12) United States Patent
Xi et al.

(10) Patent No.: US 12,666,165 B2
(45) Date of Patent: Jun. 23, 2026

(54) COMPRESSED ULTRAFAST IMAGING DEVICE BASED ON TIME STRETCHING, AND METHOD AND STORAGE MEDIUM

(71) Applicant: WUYI UNIVERSITY, Jiangmen (CN)

(72) Inventors: Jiangtao Xi, Jiangmen (CN); Jiale Long, Jiangmen (CN); Chuisong Meng, Jiangmen (CN); Kesen Huang, Jiangmen (CN); Yingrong Li, Jiangmen (CN); Zhao Ma, Jiangmen (CN); Jian Pan, Jiangmen (CN); Jiekai Zhuo, Jiangmen (CN); Jianmin Zhang, Jiangmen (CN); Zaiming Li, Jiangmen (CN); Haoming Huang, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 276 days.

(21) Appl. No.: 18/709,626

(22) PCT Filed: Dec. 14, 2023

(86) PCT No.: PCT/CN2023/138809
§ 371 (c)(1),
(2) Date: May 13, 2024

(87) PCT Pub. No.: WO2024/193127
PCT Pub. Date: Sep. 26, 2024

(65) Prior Publication Data
US 2026/0172700 A1 Jun. 18, 2026

(30) Foreign Application Priority Data
Mar. 20, 2023 (CN) .......................... 202310276301.6

(51) Int. Cl.
*H04N 23/95* (2023.01)
*H04N 23/55* (2023.01)
*H04N 23/56* (2023.01)

(52) U.S. Cl.
CPC ............. *H04N 23/95* (2023.01); *H04N 23/55* (2023.01); *H04N 23/56* (2023.01)

(58) Field of Classification Search
CPC ........ H04N 23/95; H04N 23/55; H04N 23/56; H04N 5/7416; H04N 13/254; H03M 7/3062
See application file for complete search history.

(56) References Cited

U.S. PATENT DOCUMENTS

| | | | | |
|---|---|---|---|---|
| 2017/0163971 A1* | 6/2017 | Wang | .................... | G06T 1/0007 |
| 2018/0224552 A1* | 8/2018 | Wang | .................. | H04N 19/593 |

(Continued)

FOREIGN PATENT DOCUMENTS

| | | |
|---|---|---|
| CN | 114088202 A | 2/2022 |
| CN | 115047001 A | 9/2022 |

(Continued)

OTHER PUBLICATIONS

International Searching Authority. International Search Report and Written Opinion for PCT Application No. PCT/CN2023/138809 and English translation, mailed Feb. 29, 2024, pp. 1-10.

*Primary Examiner* — Nhan T Tran
(74) *Attorney, Agent, or Firm* — Vivacqua Crane, PLLC

(57) ABSTRACT

A compressed ultrafast imaging device based on time stretching, and a method and a storage medium are disclosed. The compressed ultrafast imaging device based on time stretching includes: a laser light generation module, configured to emit laser light; a collimation module, optically connected to the laser light generation module and configured to collimate the laser light; a laser light conversion module, optically connected to the collimation module and configured to convert the collimated laser light into spatial light; an encoding module, optically connected to the laser light conversion module and configured to encode according to the spatial light; an image acquisition module, (Continued)

connected to the encoding module; and a control processing module, communicatively connected to the laser light generation module and the image acquisition module respectively, and configured to obtain a target image sequence frame based on an observed image sent by the image acquisition module.

10 Claims, 3 Drawing Sheets

(56) References Cited

U.S. PATENT DOCUMENTS

| | | | | |
|---|---|---|---|---|
| 2020/0056986 A1 * | 2/2020 | Wang | ................ | G01N 21/1702 |
| 2020/0288110 A1 * | 9/2020 | Wang | ................... | H04N 13/218 |
| 2023/0401765 A1 * | 12/2023 | Liang | ........................ | G06T 9/00 |

FOREIGN PATENT DOCUMENTS

| | | | | | |
|---|---|---|---|---|---|
| CN | 115348434 A | * | 11/2022 | ........... | H04N 13/161 |
| CN | 116405762 A | | 7/2023 | | |

* cited by examiner

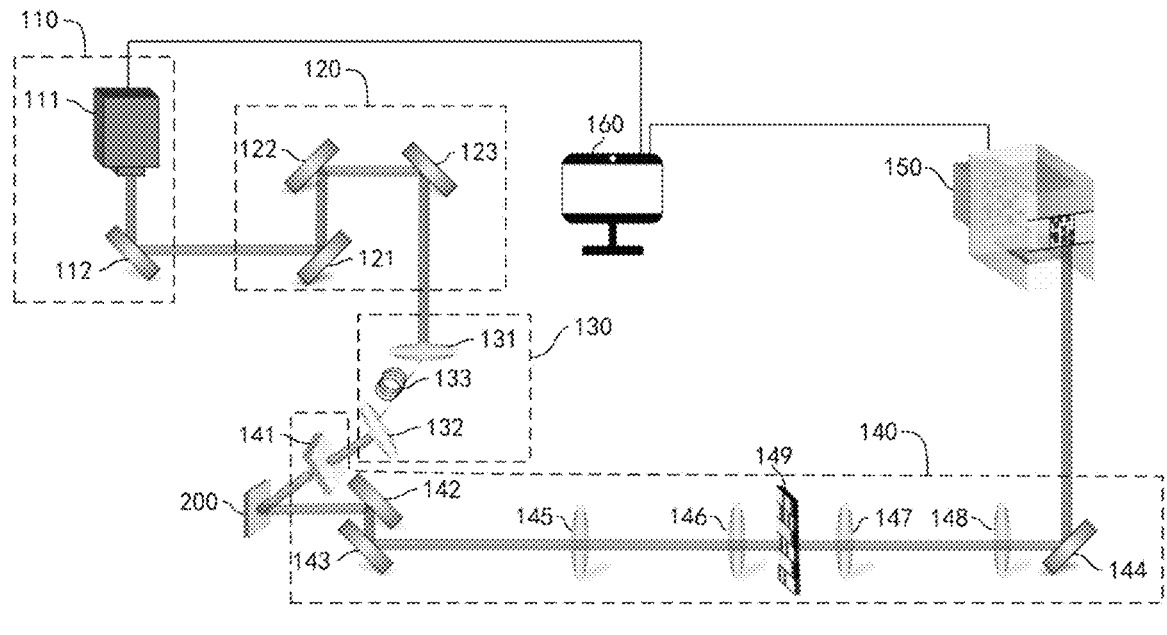

Fig. 2

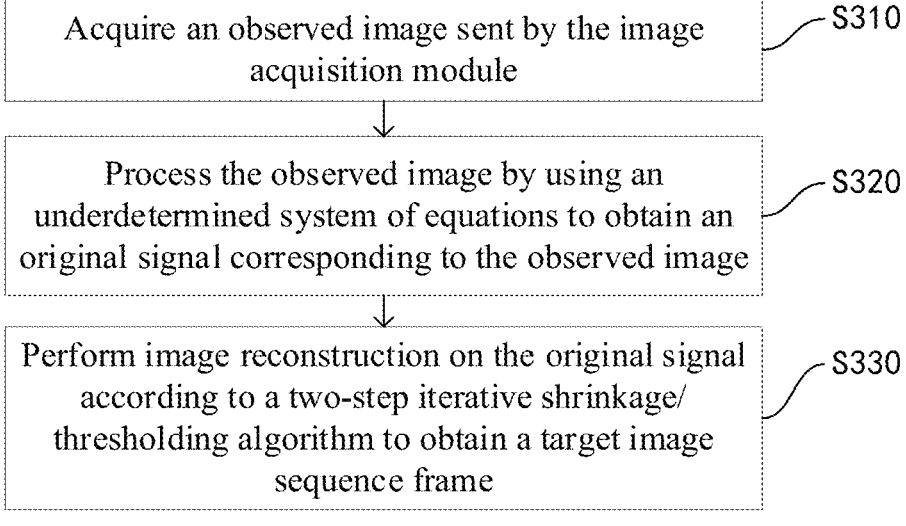

| | |
|---|---|
| Acquire an observed image sent by the image acquisition module | S310 |
| Process the observed image by using an underdetermined system of equations to obtain an original signal corresponding to the observed image | S320 |
| Perform image reconstruction on the original signal according to a two-step iterative shrinkage/ thresholding algorithm to obtain a target image sequence frame | S330 |

Fig. 3

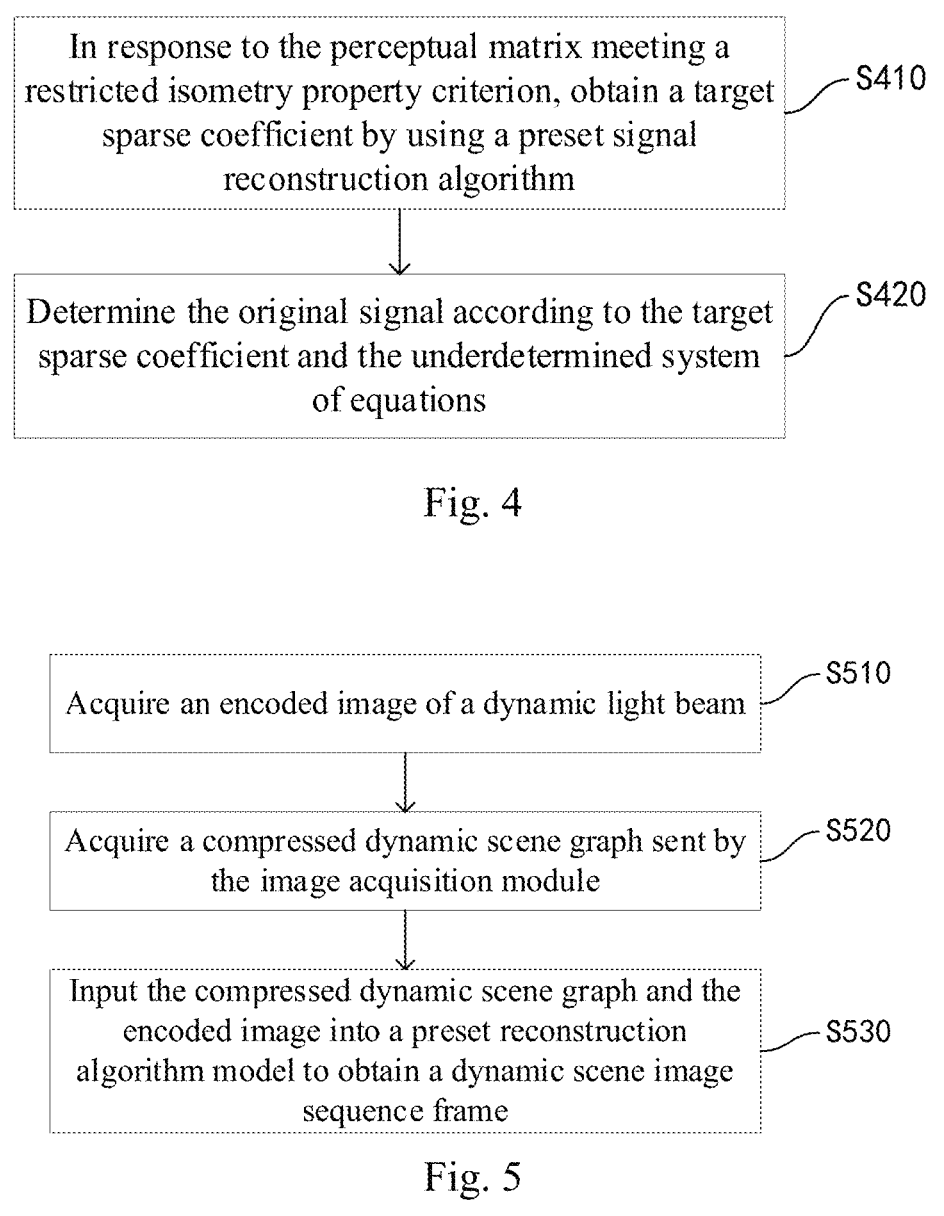

In response to the perceptual matrix meeting a restricted isometry property criterion, obtain a target sparse coefficient by using a preset signal reconstruction algorithm ⟋ S410

Determine the original signal according to the target sparse coefficient and the underdetermined system of equations ⟋ S420

Fig. 4

Acquire an encoded image of a dynamic light beam ⟋ S510

Acquire a compressed dynamic scene graph sent by the image acquisition module ⟋ S520

Input the compressed dynamic scene graph and the encoded image into a preset reconstruction algorithm model to obtain a dynamic scene image sequence frame ⟋ S530

Fig. 5

COMPRESSED ULTRAFAST IMAGING DEVICE BASED ON TIME STRETCHING, AND METHOD AND STORAGE MEDIUM

CROSS-REFERENCE TO RELATED APPLICATIONS

This application is a national stage filing under 35 U.S.C. § 371 of international application number PCT/CN2023/138809, filed Dec. 14, 2023, which claims priority to Chinese patent application No. 202310276301.6 filed Mar. 20, 2023. The contents of these applications are incorporated herein by reference in their entirety.

TECHNICAL FIELD

The present disclosure relates to, but is not limited to, the technical field of high-speed imaging, and particularly relates to a compressed ultrafast imaging device based on time stretching, and method and a storage medium.

BACKGROUND

The ultrafast imaging technology is a key core technology for exploring various unknown transient processes. The ultrafast imaging technology can be used to record transient events that are unrepeatable or difficult to generate. In the existing technology, compressed ultrafast photography (CUP) is one of the most common imaging systems in ultrafast imaging and is widely used in ultrafast imaging of visualized two-dimensional spatial information. However, the time resolution of CUP is limited by the response time resolution of a streak tube in a streak camera. Generally, the time resolution of CUP can only be achieved at picosecond level, and thus the time resolution of ultrafast imaging is low.

SUMMARY

Embodiments of the present disclosure provide a compressed ultrafast imaging device based on time stretching, and a method and a storage medium, which can effectively improve the time resolution of ultrafast imaging.

In accordance with a first aspect of the present disclosure, an embodiment provides a compressed ultrafast imaging device based on time stretching, including:

- a laser light generation module, configured to emit laser light;
- a collimation module, optically connected to the laser light generation module and configured to collimate the laser light;
- a laser light conversion module, optically connected to the collimation module and configured to convert the collimated laser light into spatial light;
- an encoding module, optically connected to the laser light conversion module and configured to encode according to the spatial light;
- an image acquisition module, connected to the encoding module; and
- a control processing module, communicatively connected to the laser light generation module and the image acquisition module respectively and configured to obtain a target image sequence frame according to an observed image sent by the image acquisition module.

The compressed ultrafast imaging device based on time stretching according to the embodiment in the first aspect of the present disclosure has at least the following beneficial effects. The compressed ultrafast imaging device based on time stretching includes: a laser light generation module, a collimation module, a laser light conversion module, an encoding module, an image acquisition module, and a control processing module, where the collimation module is optically connected to the laser light generation module, the laser light conversion module is optically connected to the collimation module, the encoding module is optically connected to the laser light conversion module, the image acquisition module is connected to the encoding module, and the control processing module is communicatively connected to the laser light generation module and image acquisition respectively. The control processing module controls the laser light generation module to emit laser light, and then uses the collimation module to collimate the laser light to improve the directional stability of the laser light. The laser light conversion module then converts the collimated laser light into spatial light to facilitate encoding according to the spatial light by using the encoding module. The encoded spatial light is transmitted to the image acquisition module through an optical path, the image acquisition module is configured to collect an observed image, and the control processing module then obtains a target image sequence frame based on the observed image sent by the image acquisition module, which can effectively improve the time resolution of ultrafast imaging. According to the compressed ultrafast imaging device based on time stretching provided by the present disclosure, the laser light conversion module is adopted to time stretch the laser light to obtain the spatial light, and then the encoding module is adopted to spatially separate and encode the spatial light. The encoded spatial light is transmitted to the image acquisition module through the optical path, which can realize shooting of an ultrafast dynamic scene. The control processing module then obtains the target image sequence frame based on the observed image sent by the image acquisition module to reconstruct a target image sequence frame of the ultrafast dynamic scene. Compared with CUP imaging in the existing technology that is limited by the response time resolution of a streak tube in a streak camera, the device of the present disclosure effectively improves the time resolution of ultrafast imaging.

According to some embodiments in the first aspect of the present disclosure, the laser light generation module includes a laser and an attenuator, and the laser is optically connected to the attenuator.

According to some embodiments in the first aspect of the present disclosure, the collimation module includes a first reflector, a second reflector and a third reflector. The first reflector, the second reflector and the third reflector are optically connected in sequence.

According to some embodiments in the first aspect of the present disclosure, the laser light conversion module includes a first collimator, a second collimator, and a time dispersor, and the time dispersor is optically connected to the first collimator and the second collimator respectively.

According to some embodiments in the first aspect of the present disclosure, the encoding module includes a spatial dispersor, a fourth reflector, a fifth reflector, a sixth reflector, a first lens, a second lens, a third lens, a fourth lens, and a mask plate. The spatial dispersor, the fourth reflector, the fifth reflector, the first lens, the second lens, the mask plate, the third lens, the fourth lens, and the sixth reflector are optically connected in sequence.

In accordance with a second aspect of the present disclosure, an embodiment provides a compressed ultrafast imaging method based on time stretching, applied to the control processing module of the compressed ultrafast imaging device based on time stretching described in the first aspect, including:

acquiring an observed image sent by the image acquisition module;

processing the observed image by using an underdetermined system of equations to obtain an original signal corresponding to the observed image; and performing image reconstruction on the original signal according to a two-step iterative shrinkage/thresholding algorithm to obtain a target image sequence frame.

The compressed ultrafast imaging method based on time stretching according to the embodiment in the second aspect of the present disclosure has at least the following beneficial effects: by acquiring the observed image sent by the image acquisition module, and then processing the observed image by using the underdetermined system of equations to obtain the original signal corresponding to the observed image, the calculation efficiency can be effectively improved; and by performing image reconstruction on the original signal according to the two-step iterative shrinkage/thresholding algorithm to ensure accurate reconstruction of the original signal and obtain the target image sequence frame, the time resolution of ultrafast imaging can be effectively improved.

According to some embodiments in the second aspect of the present disclosure, the underdetermined system of equations is y=Φx=Φψs=As, where y represents a known measured value, $y \in R^m$, Φ represents a measurement matrix, the size of Φ being M× N, x represents the original signal, $x \in R^n$, ψ represents a sparse basis matrix, s represents a sparse coefficient, the number of non-zero elements in s being c, and c<m<n, A represents a perception matrix, A=Φψ, the size of A being M× N.

According to some embodiments in the second aspect of the present disclosure, the processing the observed image by using an underdetermined system of equations to obtain an original signal corresponding to the observed image includes:

in response to the perceptual matrix meeting a restricted isometry property criterion, obtaining a target sparse coefficient by using a preset signal reconstruction algorithm; and determining the original signal according to the target sparse coefficient and the underdetermined system of equations.

According to some embodiments in the second aspect of the present disclosure, the two-step iterative shrinkage/thresholding algorithm is:

$$\hat{I} = \underset{I}{\arg\min}\{0.5\|E - TSCI\|_2^2 + r\|x\|_{TV}\},$$

where $\|\bullet\|_2$ is a $l_2$ norm, $\|\bullet\|_{TV}$ is a TV function, r represents a weight ratio between adjusting a regularization parameter and measuring a fidelity, I represents dynamic scene data, T represents a time-space integration operator, S represents a time shearing operator in the vertical direction, C represents an encoding operator, and E represents image data of the observed image.

In accordance with a third aspect of the present disclosure, an embodiment further provides a computer-readable storage medium storing computer-executable instructions, wherein the computer-executable instructions are configured to cause a computer to perform the compressed ultrafast imaging method based on time stretching described in the second aspect.

BRIEF DESCRIPTION OF DRAWINGS

The accompanying drawings are used to provide a further understanding of the technical solutions of the present disclosure, and constitute a part of the specification. The accompanying drawings and the embodiments of the present disclosure are used to explain the technical solutions of the present disclosure, and do not constitute a limitation on the technical solutions of the present disclosure.

FIG. 2 is a schematic diagram of an optical path of a compressed ultrafast imaging device based on time stretching provided by another embodiment of the present disclosure;

FIG. 3 is a flow chart of steps of a compressed ultrafast imaging method based on time stretching provided by another embodiment of the present disclosure;

FIG. 4 is a flow chart of steps of obtaining an original signal corresponding to an observed image provided by another embodiment of the present disclosure; and FIG. 5 is a flow chart of steps of a compressed ultrafast imaging method based on time stretching provided by another embodiment of the present disclosure.

DETAILED DESCRIPTION

Figure 1:
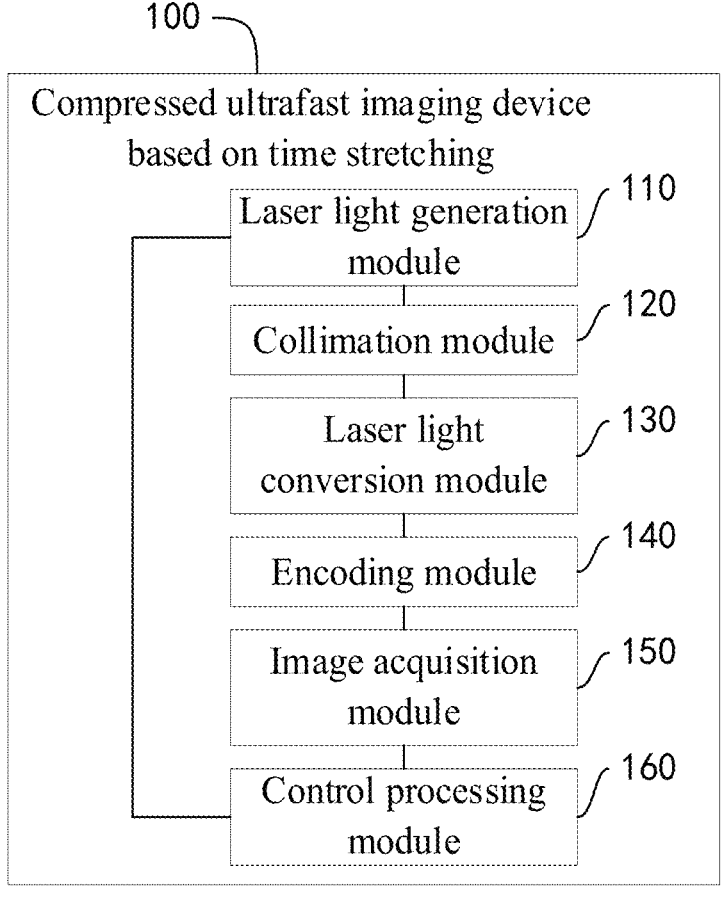
FIG. 1 is a schematic diagram of modules of a compressed ultrafast imaging device based on time stretching provided by an embodiment of the present disclosure.

In order to make the objects, technical solutions, and advantages of the present disclosure clearer, the present disclosure will be further described in detail below with reference to the drawings and embodiments. It should be understood that the specific embodiments described here are only used to explain the present disclosure and are not used to limit the present disclosure.

It will be understood that the functional modules are divided in the device schematic diagram and the logical sequence is shown in the flowchart. However, in some cases, the illustrated or described steps can be executed in a module division different form that of the device, or performed in an order different from that in the flow chart. The terms "first", "second", and the like in the specification, claims or the above-mentioned drawings are used to distinguish similar objects and are not necessarily used to describe a specific order or sequence.

The present disclosure provides a compressed ultrafast imaging device and method based on time stretching, and a storage medium. The compressed ultrafast imaging devices based on time stretching includes: a laser light generation module, a collimation module, a laser light conversion module, an encoding module, an image acquisition module, and a control processing module, where the collimation module is optically connected to the laser light generation module, the laser light conversion module is optically connected to the collimation module, the encoding module is optically connected to the laser light conversion module, the image acquisition module is connected to the encoding module, and the control processing module is communicatively connected to the laser light generation module and image acquisition module respectively. The control processing module controls the laser light generation module to emit laser light, and then uses the collimation module to collimate the laser light to improve the directional stability of the laser light, the laser light conversion module then converts the collimated laser light into spatial light to facilitate encoding according to the spatial light by using the encoding module, the encoded spatial light is transmitted to the image acquisition module through an optical path, and the image acquisition module is configured to collect an observed image. The control processing module then obtains a target image sequence frame based on the observed image sent by the image acquisition module, which can effectively improve the time resolution of ultrafast imaging. According to the compressed ultrafast imaging device based on time stretching provided by the present disclosure, the laser light conversion module is adopted to time stretch the laser light to obtain the spatial light, and then the encoding module is adopted to spatially separate and encode the spatial light. The encoded spatial light is transmitted to the image acquisition module through the optical path, which can realize shooting of an ultrafast dynamic scene. The control processing module then obtains the target image sequence frame based on the observed image sent by the image acquisition module to reconstruct a target image sequence frame of the ultrafast dynamic scene. Compared with CUP imaging in the existing technology that is limited by the response time resolution of a streak tube in a streak camera, the device of the present disclosure effectively improves the time resolution of ultrafast imaging.

The embodiments of the present disclosure will be further described below with reference to the accompanying drawings.

Referring to FIG. 1, FIG. 1 is a schematic diagram of modules of a compressed ultrafast imaging device 100 based on time stretching provided by an embodiment of the present disclosure. The compressed ultrafast imaging device 100 based on time stretching includes:

a laser light generation module 110, configured to emit laser light;

a collimation module 120, optically connected to the laser light generation module 110 and configured to collimate the laser light;

a laser light conversion module 130, optically connected to the collimation module 120 and configured to convert the collimated laser light into spatial light;

an encoding module 140, optically connected to the laser light conversion module 130 and configured to encode according to spatial light;

an image acquisition module 150, connected to the encoding module 140; and a control processing module 160, communicatively connected to the laser light generation module 110 and the image acquisition module 150 respectively and configured to obtain a target image sequence frame according to an observed image sent by the image acquisition module 150.

It should be noted that the embodiments of the present disclosure do not limit the specific type of the image acquisition module 150, which can be a synchronous streak camera, a femtosecond streak camera, or a high dynamic range streak camera. It can be understood that the synchronous streak camera can capture spatial data or spectrum data synchronously, and has the characteristics of fast response speed, high time resolution and high reliability. The use of the synchronous streak camera can effectively improve the accuracy of image collection.

It can be understood that the control processing module 160 controls the laser light generation module 110 to emit laser light, and then uses the collimation module 120 to collimate the laser light to improve the directional stability of the laser light. The laser light conversion module 130 then converts the collimated laser light into spatial light to facilitate encoding according to the spatial light by using the encoding module 140. The encoding is achieved according to different spatial coordinates corresponding to different pulse frequency components of the spatial light. The encoded spatial light is transmitted to the image acquisition module 150 through an optical path, the image acquisition module 150 is configured to collect an observed image, and the control processing module 160 then obtains a target image sequence frame based on the observed image sent by the image acquisition module 150, which can effectively improve the time resolution of ultrafast imaging. According to the compressed ultrafast imaging device 100 based on time stretching provided by the present disclosure, the laser light conversion module 130 is adopted to time stretch the laser light to obtain the spatial light, and then the encoding module 140 is configured to spatially separate and encode the spatial light. The encoded spatial light is transmitted to the image acquisition module 150 through the optical path, which can realize shooting of an ultrafast dynamic scene. The control processing module 160 then obtains the target image sequence frame based on the observed image sent by the image acquisition module 150 to reconstruct a target image sequence frame of the ultrafast dynamic scene. Compared with CUP imaging in the existing technology that is limited by the response time resolution of a streak tube in a streak camera, the device of the present disclosure achieves the following effects: a specific light source constraint condition is not needed, the optical path is simple, the light loss can be effectively reduced, and the time resolution of ultrafast imaging.

Referring to FIG. 2, in some embodiments of the present disclosure, the laser light generation module 110 includes a laser 111 and an attenuator 112, and the laser 111 is optically connected to the attenuator 112.

It should be noted that the embodiments of the present disclosure do not limit the specific type of the laser 111, which can be a femtosecond laser, a fiber laser, or an ultra-short pulse laser. It can be understood that the femtosecond laser has the characteristics of large energy, short pulse, fast speed and high resolution. Using femtosecond laser as the laser can ensure the light quality and spectral stability of the laser light emitted by the laser.

It can be understood that the output power of the laser 111 can be 1300 nw and the wavelength can be 800 nm. The light outlet of the attenuator 112 can be 0.05%, which can effectively reduce the light intensity of the laser light.

It can be understood that the laser 111 emits laser light. Since the laser 111 is optically connected to the attenuator 112, the laser light passes through the attenuator 112 along the optical path to reduce the light intensity of the laser light, avoid the problem of overexposure which may cause damage to the image acquisition module 150, and also ensure the accuracy of ultrafast imaging.

In some embodiments of the present disclosure, the collimation module 120 includes a first reflector 121, a second reflector 122, and a third reflector 123. The first reflector 121, the second reflector 122, and the third reflector 123 are optically connected in sequence.

It should be noted that the embodiments of the present disclosure do not limit the specific structure of the collimation module 120, which may include a first reflector 121, a second reflector 122 and a third reflector 123, or may include more than three reflectors, etc., as long as it can collimate the laser light.

It can be understood that after passing through the attenuator 112, the laser light passes through the first reflector 121, the second reflector 122, and the third reflector 123 in sequence along the optical path, so that the laser light becomes collimated laser light, thereby improving the directional stability of the laser light. Moreover, the angle of the laser light is adjusted through the first reflector 121, the second reflector 122, and the third reflector 123, so that the height of the laser light is the same as the height of a slit of the image acquisition module 150, thereby reducing the height difference and improving the efficiency of the observed image collected by the image acquisition module 150.

In some embodiments of the present disclosure, the laser light conversion module 130 includes a first collimator 131, a second collimator 132, and a time dispersor 133. The time dispersor 133 is optically connected to the first collimator 131 and the second collimator 133 respectively.

It should be noted that the embodiments of the present disclosure do not limit the specific structure of the laser light conversion module 130, which may include a first collimator 131, a second collimator 132 and a time dispersor 133, or may include more than three collimators and a time dispersor 133, as long as it can convert the collimated laser light into spatial light.

It can be understood that the laser light enters the laser light conversion module 130 along the optical path after passing through the collimation module 120. The light conversion module includes a first collimator 131, a second collimator 132 and a time dispersor 133. The time dispersor 133 is optically connected to the first collimator 131 and the second collimator 132 respectively. The collimated laser light passes through the first collimator 131, the time dispersor 133 and the second collimator 132 in sequence. The collimated laser light is first collimated by the first collimator 131 to ensure the directional stability of the laser light, and then enters the time dispersor 133, so that the pulse spectrum of the laser light is mapped or time stretched into a 1D time data stream, which can reduce light loss, and then the laser light is converted into spatial light through the second collimator 132.

In some embodiments of the present disclosure, the encoding module 140 includes a spatial dispersor 141, a fourth reflector 142, a fifth reflector 143, a sixth reflector 144, a first lens 145, a second lens 146, a third lens 147, a fourth lens 148, and a mask plate 149. The spatial dispersor 141, the fourth reflector 142, the fifth reflector 143, the first lens 145, the second lens 146, the mask plate 149, the third lens 147, the fourth lens 148, and the sixth reflector 144 are optically connected in sequence.

It should be noted that the embodiments of the present disclosure do not limit the specific structure of the encoding module 140, which may include a spatial dispersor 141, a fourth reflector 142, a fifth reflector 143, a sixth reflector 144, a first lens 145, a second lens 146, a third lens 147, a fourth lens 148 and a mask plate 149, or may include a spatial dispersor 141, more than three reflectors, more than four lenses and the mask plate 149, etc.

It can be understood that the focal length of the first lens 145 can be 75 mm, and the focal length of the second lens 146 can be 100 mm. A first optical 4f system composed of the first lens 145 and the second lens 146 enables a rainbow light beam to be focused on the mask plate 149. The focal length of the third lens 147 can be 100 mm, and the focal length of the fourth lens 148 can be 150 mm. A second optical 4f system composed of the third lens 147 and the fourth lens 148 can realize optical filtering.

It can be understood that the spatial light enters the encoding module 140 along the optical path, where the encoding module 140 includes a spatial dispersor 141, a fourth reflector 142, a fifth reflector 143, a sixth reflector 144, a first lens 145, a second lens 146, a third lens 147, a fourth lens 148 and a mask plate 149, and the spatial dispersor 141, the fourth reflector 142, the fifth reflector 143, the first lens 145, the second lens 146, the mask plate 149, the third lens 147, the fourth lens 148, and the sixth reflector 144 are optically connected in sequence. The spatial light first enters the spatial dispersor 141, so that the pulse spectrum of the spatial light is mapped into a 1D or 2D rainbow light beam to achieve spatial separation of the spatial light, thereby illuminating a dynamic sample 200. The dynamic sample 200 is located at a middle position between the spatial dispersor 141 and the fourth reflector 142. The encoding is achieved according to different spatial coordinates corresponding to different pulse frequency components of the spatial light. The encoded rainbow light beam first passes through the fourth reflector 142 and the fifth reflector 143 to ensure the accuracy of the light transmission direction of the encoded rainbow light beam, and then passes through the first optical 4f system composed of the first lens 145 and the second lens 146 to enable the rainbow light beam to be focused on the mask plate 149. The mask plate 149 is preloaded with a random matrix to ensure the efficiency of encoding. The encoded image enters the second optical 4f system composed of the third lens 147 and the fourth lens 148 along the optical path to implement filtering processing on the encoded image, improve the image quality of the encoded image, and reduce data redundancy, thereby effectively improving the time resolution of ultrafast imaging. The encoded image passes through the sixth reflector 144 and then reaches the image acquisition module 150.

Referring to FIG. 3, FIG. 3 is a flow chart of steps of a compressed ultrafast imaging method based on time stretching provided by an embodiment of the present disclosure. The compressed ultrafast imaging method based on time stretching is applied to the control processing module 160 of the above compressed ultrafast imaging device based on time stretching. The method includes, but is not limited to, the following steps:

Step 310, acquiring an observed image sent by the image acquisition module;

Step 320, processing the observed image by using an underdetermined system of equations to obtain an original signal corresponding to the observed image; and Step 330, performing image reconstruction on the original signal according to a two-step iterative shrinkage/thresholding algorithm to obtain a target image sequence frame.

It can be understood that by acquiring the observed image sent by the image acquisition module, and then processing the observed image by using the underdetermined system of equations to obtain the original signal corresponding to the observed image. On this basis, the calculation efficiency can be effectively improved, and by performing image reconstruction on the original signal according to the two-step iterative shrinkage/thresholding algorithm to ensure accurate reconstruction of the original signal and obtain the target image sequence frame, the time resolution of ultrafast imaging can be effectively improved.

In some embodiments of the present disclosure, the underdetermined system of equations is $y = \Phi x = \Phi \psi s = As$, where y represents a known measured value, $y \in R^m$, $\Phi$ represents a measurement matrix, the size of $\Phi$ being Mx N, x represents the original signal, $x \in R^n$, y represents a sparse basis matrix, s represents a sparse coefficient, the number of non-zero elements in s being c, and c<m<n, A represents a perception matrix, A=Φψ, the size of A being Mx N.

It can be understood that for sparse signals or compressible signals, compressed sensing can sample data at a frequency lower than the Nyquist sampling frequency, thereby reducing the amount of data transmission, and accurately reconstructing the signal. However, a natural signal itself is not sparse, and needs to be sparsified on a sparse basis. That is, assuming x=ψs, the sparse representation of the signal is obtained, and the underdetermined system of equations y=Φx=Φψs=As is obtained.

In addition, referring to FIG. 4, in one embodiment, step 320 in the embodiment shown in FIG. 3 also includes, but is not limited to, the following steps:

Step 410, in response to the perceptual matrix meeting a restricted isometry property criterion, obtaining a target sparse coefficient by using a preset signal reconstruction algorithm; and:

Step 420, determining the original signal according to the target sparse coefficient and the underdetermined system of equations.

It can be understood that the preset signal reconstruction algorithm can be $\min\|S\|_0.s.t.y=As$, and the restricted isometry property criterion is defined as a parameter $\delta_k$ of the restricted isometry property criterion of the existence matrix B, $0<t_k<1$, and meets $$(\delta)\|c\|_2^2 \leq \|Bc\|_2^2 \leq (1 + a)\|c\|_2^2,$$

where c represents the sparse signal of k, if $\delta_k<1$, then the matrix B meets a k hierarchy-restricted isometry property criterion.

It can be understood that, based on the known measured value and the perception matrix, solving the sparse coefficient or original signal is equivalent to solving the problem of linear equations. In the underdetermined system of equations, since the number of equations is much smaller than the number of unknowns, the problem becomes a problem of solving an underdetermined system of equations, but there are infinitely many solutions to the underdetermined system of equations. When the perception matrix meets the restricted isometry property criterion, the preset signal reconstruction algorithm can be used to calculate the unique solution to the underdetermined system of equations, obtain the target sparse coefficient, and then determine the original signal based on the target sparse coefficient and the underdetermined system of equations.

In some embodiments of the present disclosure, the two-step iterative shrinking/thresholding algorithm is:

$$\hat{I} = \arg\min_I \{0.5\|E - TSCI\|_2^2 + r\|x\|_{TV}\},$$

where $\|\cdot\|_2$ is a $l_2$ norm, $\|\cdot\|_{TV}$ is a TVfunction, r represents a weight ratio between adjusting a regularization parameter and measuring a fidelity, I represents dynamic scene data, T represents a time-space integration operator, S represents a time shearing operator in the vertical direction, C represents an encoding operator, and E represents image data of the observed image.

It can be understood that an initial guess can be set as a point in the n-dimensional space, recorded as $I_0$, a target point $I_L$ is searched from the initial point $I_0$, and an intermediate point $I_t$ is updated in each iteration until the intermediate point $I_t$ is close to the target point $I_L$. The search path should follow the preset signal reconstruction algorithm to improve the accuracy of the obtained target image sequence frame. The two-step iterative shrinkage/thresholding algorithm is used to perform image reconstruction on the original signal to obtain a target image sequence frame, which can effectively improve the time resolution of ultrafast imaging.

Referring to FIG. 5, FIG. 5 is a flow chart of steps of a compressed ultrafast imaging method based on time stretching provided by another embodiment of the present disclosure. The compressed ultrafast imaging method based on time stretching is applied to the control processing module 160 of the above compressed ultrafast imaging device 100 based on time stretching. The method may also include, but is not limited to, the following steps:

Step S510, acquiring an encoded image of a dynamic light beam;

Step S520, acquiring a compressed dynamic scene graph sent by the image acquisition module; and Step S530, inputting the compressed dynamic scene graph and the encoded image into a preset reconstruction algorithm model to obtain a dynamic scene image sequence frame.

It can be understood that after the dynamic light beam is encoded, the encoded image is transmitted to the image acquisition module, and the image acquisition module cuts the dynamic scene and shoots the cut scene to obtain the compressed dynamic scene graph. The encoded image of the dynamic light beam and the compressed dynamic scene graph are acquired, and the compressed dynamic scene graph and the encoded image are inputted into the preset reconstruction algorithm model to obtain the dynamic scene image sequence frame, which can completely capture the dynamic process and observe the ultrafast dynamic scene, thereby ensuring the time resolution of ultrafast imaging.

In addition, an embodiment of the present disclosure also provides a computer-readable storage medium storing computer-executable instructions which, when executed by a processor or a controller, can cause the processor to perform the compressed ultrafast imaging method based on time stretching applied to the control processing module 160 of the compressed ultrafast imaging device 100 based on time stretching in the above embodiment. For example, the instructions cause the processor to perform the step 310 to step 330 in FIG. 3 described above, step 410 to step 420 in FIG. 4 described above, and step S510 to step S530 in FIG. 5 described above. Those of ordinary skill in the art can understand that all or some steps and systems in the method disclosed above can be implemented as software, firmware, hardware, and appropriate combinations thereof. Some or all of the physical components can be implemented as software executed by a processor, such as a central processing unit, a digital signal processor, or a microprocessor, or as hardware, or as an integrated circuit, such as an disclosure specific integrated circuit. Such software can be distributed on computer-readable media, which may include computer storage media (or non-transitory media) and communication media (or transitory media). As is known to those of ordinary skill in the art, the term "computer storage medium" includes volatile and nonvolatile, removable and non-removable media implemented in any method or technology for storage of information such as computer readable instructions, data structures, program modules or other data. The computer storage medium includes, but is not limited to, an RAM, an ROM, an EEPROM, a flash memory or other memory technologies, a CD-ROM, a digital versatile disk (DVD) or other optical disk storage, a magnetic cassette, a tape, disk storage or other magnetic storage devices, or any other media that can be used to store the desired information and that can be accessed by a computer. Additionally, it is known to those of ordinary skill in the art that a communication medium typically includes computer readable instructions, data structures, program modules or other data in a modulated data signal (such as a carrier wave or other transport mechanism), and may include any information delivery media.

In the description of this specification, description referring to the terms "one embodiment", "some embodiments," "illustrative embodiments," "examples," "specific examples", or "some examples" or the like means that specific features, structures, materials, or characteristics in combination with the embodiment or illustrative description are included in at least one embodiment or example of the present disclosure. In this specification, schematic representations of the above terms do not necessarily refer to the same embodiment or example. Furthermore, the specific features, structures, materials or characteristics described can be combined in any suitable manner in any one or more embodiments or examples.

The above is a detailed description of the preferred implementation of the present disclosure, but the present disclosure is not limited to the above-mentioned embodiments. Those skilled in the art can also make various equivalent modifications or substitutions without violating the gist of the present disclosure. The equivalent modifications or substitutions are included within the scope defined by the claims of the present disclosure.

What is claimed is:

1. A compressed ultrafast imaging device based on time stretching, comprising:

a laser light generation module, configured to emit laser light;

a collimation module, optically connected to the laser light generation module and configured to collimate the laser light;

a laser light conversion module, optically connected to the collimation module and configured to convert the collimated laser light into spatial light;

an encoding module, optically connected to the laser light conversion module and configured to encode according to the spatial light;

an image acquisition module, connected to the encoding module; and a control processing module, communicatively connected to the laser light generation module and the image acquisition module respectively and configured to obtain a target image sequence frame according to an observed image sent by the image acquisition module.

2. The compressed ultrafast imaging device based on time stretching according to claim 1, wherein the laser light generation module comprises a laser and an attenuator, and the laser is optically connected to the attenuator.

3. The compressed ultrafast imaging device based on time stretching according to claim 1, wherein the collimation module comprises a first reflector, a second reflector and a third reflector, and wherein the first reflector, the second reflector and the third reflector are optically connected in sequence.

4. The compressed ultrafast imaging device based on time stretching according to claim 1, wherein the laser light conversion module comprises a first collimator, a second collimator, and a time dispersor, and the time dispersor is optically connected to the first collimator and the second collimator respectively.

5. The compressed ultrafast imaging device based on time stretching according to claim 1, wherein the encoding module comprises a spatial dispersor, a fourth reflector, a fifth reflector, a sixth reflector, a first lens, a second lens, a third lens, a fourth lens, and a mask plate; and wherein the spatial dispersor, the fourth reflector, the fifth reflector, the first lens, the second lens, the mask plate, the third lens, the fourth lens, and the sixth reflector are optically connected in sequence.

6. A compressed ultrafast imaging method based on time stretching, applied to the control processing module of the compressed ultrafast imaging device based on time stretching according to claim 1, comprising:

acquiring an observed image sent by the image acquisition module;

processing the observed image by using an underdetermined system of equations to obtain an original signal corresponding to the observed image; and performing image reconstruction on the original signal according to a two-step iterative shrinkage/thresholding algorithm to obtain a target image sequence frame.

7. The compressed ultrafast imaging method based on time stretching according to claim 6, wherein the underdetermined system of equations is $$y=\Phi x=\Phi\psi s=As,$$

where y represents a known measured value, $y\in R^{m}$, $\Phi$ represents a measurement matrix, the size of $\Phi$ being M×N, x represents the original signal, $x\in R^{n}$, $\psi$ represents a sparse basis matrix, s represents a sparse coefficient, the number of non-zero elements in s being c, and c<m<n, A represents a perception matrix, $A=\Phi\psi$, the size of A being M×N.

8. The compressed ultrafast imaging method based on time stretching according to claim 7, wherein the processing the observed image by using an underdetermined system of equations to obtain an original signal corresponding to the observed image comprises:

in response to the perceptual matrix meeting a restricted isometry property criterion, obtaining a target sparse coefficient by using a preset signal reconstruction algorithm; and determining the original signal according to the target sparse coefficient and the underdetermined system of equations.

9. The compressed ultrafast imaging method based on time stretching according to claim 6, wherein the two-step iterative shrinkage/thresholding algorithm is:

$$\hat{I} = \arg\min_{I}\{0.5\|E - TSCI\|_2^2 + r\|x\|_{TV}\},$$

where $\|\bullet\|_2$ is a $l_2$ norm, $\|\bullet\|$Tv is a TV function, r represents a weight ratio between adjusting a regularization parameter and measuring a fidelity, I represents dynamic scene data, T represents a time-space integration operator, S represents a time shearing operator in the vertical direction, C represents an encoding operator, and E represents image data of the observed image.

10. A non-transitory computer-readable storage medium storing computer-executable instructions, wherein the computer-executable instructions are configured to cause a computer to perform the compressed ultrafast imaging method based on time stretching according to claim 6.

* * * * *